United States Patent
Yoshizawa

(10) Patent No.: US 8,427,802 B2
(45) Date of Patent: Apr. 23, 2013

(54) INPUT OVERVOLTAGE PROTECTION CIRCUIT WITH SOFT-START FUNCTION

(75) Inventor: Takeshi Yoshizawa, Kawasaki (JP)

(73) Assignee: Renesas Electronics Corporation, Kanagawa (JP)

( * ) Notice: Subject to any disclaimer, the term of this patent is extended or adjusted under 35 U.S.C. 154(b) by 374 days.

(21) Appl. No.: 12/772,331

(22) Filed: May 3, 2010

(65) Prior Publication Data

US 2010/0284116 A1  Nov. 11, 2010

(30) Foreign Application Priority Data

May 8, 2009 (JP) ................................. 2009-113468

(51) Int. Cl.
- *H02H 3/20* (2006.01)
- *H02H 9/04* (2006.01)
- *H02H 3/08* (2006.01)
- *H02H 9/02* (2006.01)

(52) U.S. Cl.
USPC ........................................ 361/91.1; 361/93.1

(58) Field of Classification Search ................. 361/91.1, 361/93.1
See application file for complete search history.

(56) References Cited

U.S. PATENT DOCUMENTS

| | | | | |
|---|---|---|---|---|
| 7,129,679 B2 * | 10/2006 | Inaba et al. | | 323/222 |
| 7,394,223 B2 * | 7/2008 | Lai et al. | | 320/134 |
| 7,826,190 B2 * | 11/2010 | Wu et al. | | 361/91.1 |
| 2008/0186644 A1 * | 8/2008 | Migliavacca | | 361/86 |

FOREIGN PATENT DOCUMENTS

| | | |
|---|---|---|
| JP | 2002-186174 A | 6/2002 |
| JP | 2008-104328 A | 5/2008 |
| JP | 2008-160934 A | 7/2008 |
| JP | 2008-182802 A | 8/2008 |

OTHER PUBLICATIONS

Office Action, dated Dec. 18, 2012, issued by the Japanese Patent Office in counterpart Japanese Application No. 2009-113468.

* cited by examiner

*Primary Examiner* — Rexford Barnie
*Assistant Examiner* — Christopher Clark
(74) *Attorney, Agent, or Firm* — Sughrue Mion, PLLC

(57) ABSTRACT

An overvoltage protection circuit includes a PMOS transistor Q1 that is disposed between an input circuit 21, from which an input voltage VIN is supplied, and a system 22 and functions as a switch. A comparator 110 compares the input voltage VIN with a predetermined reference voltage to determine the occurrence of an overvoltage. Further, the comparator 110 outputs a High level as an operation signal when no overvoltage is detected. A soft switching control circuit 130 starts up by using the High level output from the comparator 110 as an enable signal, and gradually turns on the PMOS transistor Q1. A sudden change of the load exerted on the circuit on the input side is suppressed by the soft start function.

13 Claims, 12 Drawing Sheets

INPUT OVERVOLTAGE PROTECTION CIRCUIT WITH SOFT-START FUNCTION

INCORPORATION BY REFERENCE

This application is based upon and claims the benefit of priority from Japanese patent application No. 2009-113468, filed on May 8, 2009, the disclosure of which is incorporated herein in its entirety by reference.

BACKGROUND

1. Field of the Invention

The present invention relates to an input overvoltage protection circuit to protect a system from an excessive input voltage, in particular to a method for implementing a soft-start function by using a component(s) of a low withstand voltage.

2. Description of Related Art

To protect a system from an excessive input voltage, overvoltage protection circuits are incorporated into input circuits. Note that such overvoltage protection circuits need to be composed of a circuit(s) having a withstand voltage capable of withstanding a conceivably highest overvoltage input. Further, in order to reduce the load on the input side that is exerted when a switch inserted between the input and the system is turned on, it has become necessary to implement certain control to suppress the inrush current to the system. Japanese Unexamined Patent Application Publication No. 2008-182802, for example, discloses such an overvoltage protection circuit.

FIG. 12 shows an overvoltage protection circuit as related art. The overvoltage protection circuit includes a PMOS transistor Q1 to separate a system 22 from an input circuit 21, voltage-dividing resistors R1 and R2 to monitor an input voltage VIN, a comparator 11 to determine the overvoltage of the input voltage VIN, voltage-dividing resistors R3, R4 and R5 to generate a comparison reference voltage, an input resistor RIN, and a clamp circuit 12. Further, an input-side bypass capacitor CIN is disposed between the input circuit 21 and the voltage-dividing resistors R1 and R2, and an output-side bypass capacitor COUT is disposed between the PMOS transistor Q1 and the system 22.

Note that the comparator 11, the clamp circuit 12, the voltage-dividing resistors R3, R4 and R5 are integrated and constructed as an LSI (large-Scale Integrated) circuit. Further, a clamping voltage VC, which is a constant voltage output, is generated by using the clamp circuit 12 and the input resistor RIN and is used as the reference voltage of the comparator 11.

With the configuration like this, when it is detected that the input voltage VIN becomes an overvoltage in an overvoltage decision by the comparator 11, the PMOS transistor Q1 is turned off. In this way, the overvoltage is not applied to the system 22. Further, when it is determined that the input voltage VIN does not exceed the overvoltage in an overvoltage decision by the comparator 11, the PMOS transistor Q1 is turned on and the voltage is supplied to the system 22.

FIG. 13 shows a timing chart of this operation. FIG. 13 shows a potential relation of a direct-current fashion among the potential of the input voltage VIN, the gate voltage VG of the PMOS transistor Q1, and the output voltage VOUT. When the input voltage VIN gradually rises and reaches the operation start voltage at a time T00, the comparator 11 brings the gate voltage VG of the PMOS transistor Q1 to a Low level to turn on the PMOS transistor Q1. As a result, the PMOS transistor Q1 is turned on, and the output voltage VOUT is thereby supplied to the system 22. Further, if the input voltage VIN rises excessively and the comparator 11 thereby detects an overvoltage at a time T01, the comparator 11 brings the gate voltage VG of the PMOS transistor Q1 to a High level to turn off the PMOS transistor Q1. As a result, the PMOS transistor Q1 is turned off, and the voltage supply to the system 22 is stopped.

Note that in the overvoltage protection circuit shown in FIG. 12, the circuit on the LSI side can be constructed by using components of a withstand voltage lower than the input voltage VIN by interposing the clamp circuit 12.

SUMMARY

However, the overvoltage protection circuit shown in FIG. 12 has a problem described below. FIGS. 14 and 15 are graphs for explaining transient potential relations in the protection circuit shown in FIG. 12 in detail. Firstly, FIG. 14 shows a transient potential relation between the gate voltage VG of the PMOS transistor Q1 and the output voltage VOUT in a state where an input voltage VIN below an overvoltage detection level is supplied. When the input voltage VIN starts to be supplied, it immediately causes the comparator 11 to turn on the gate voltage VG of the PMOS transistor Q1 (time T10). As a result, the output voltage VOUT is supplied to the system 22. However, if the PMOS transistor Q1 is abruptly turned on, an inrush current IIN to the bypass capacitor COUT on the output side occurs and the voltage level of the input voltage VIN is thereby dropped. In recent electronic devices, a power-supply circuit on the input side detects the presence of an overcurrent. Then, the input is shut off and/or the output current is restricted. Therefore, if a voltage drop occurs due to the inrush current IIN like the one described above, a large load is exerted on the power-supply circuit on the input side, thus causing a failure and/or a malfunction in the circuit.

Further, FIG. 15 shows a transient potential relation between the gate voltage VG of the PMOS transistor Q1 and the output voltage VOUT in a state where an input voltage VIN equal to or higher than an overvoltage detection level is supplied. The input voltage VIN rises so abruptly that even if an overvoltage is detected at a time T20, the response of the PMOS transistor Q1 cannot follow the rise in the input voltage VIN. The PMOS transistor Q1 cannot be turned off until a time T21, which is delayed from the time T20. As a result, the input voltage in the overvoltage state leaks to the output voltage VOUT. When the response of the overvoltage protection circuit 10 is delayed too much as shown above, the overvoltage is applied to the system 22.

A first exemplary aspect of the present invention is an overvoltage protection circuit that prevents an overvoltage from flowing into a system and thereby protects the system, including: first switch to function as a switch disposed between an input circuit and the system, the input circuit being configured to supply an input voltage, and the first switch being constructed of a semiconductor transistor; a comparator that determines an occurrence of an overvoltage by comparing the input voltage with a predetermined reference voltage, and when no overvoltage is detected, outputs an operation signal; and a soft switching control circuit that starts up by using the operation signal from the comparator as an enable signal, and turns on the first switch gradually by gradually increasing a voltage between a source and a gate of the first switch.

With the configuration like this, it is possible to suppress the sudden change of the load exerted on the circuit on the input side by the soft start function.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Figure 1:
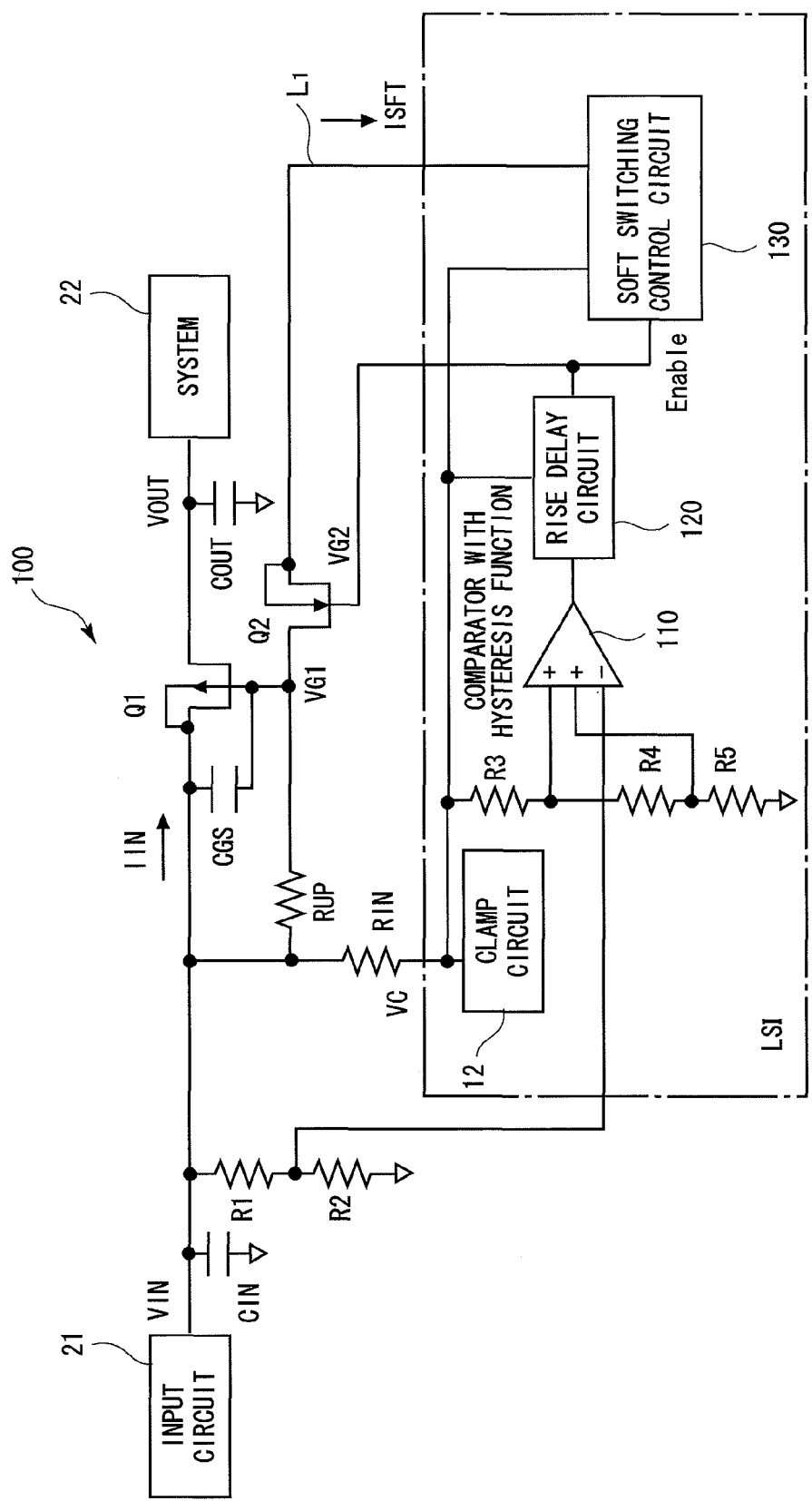
FIG. 1 shows an overvoltage protection circuit with a soft start function in accordance with a first exemplary embodiment of the present invention.

Exemplary embodiments in accordance with the present invention are shown in the drawings, and explained hereinafter with reference to the signs assigned to respective components in the drawings.

[First Exemplary Embodiment]

A first exemplary embodiment of an overvoltage protection circuit in accordance with the present invention is explained hereinafter. FIG. 1 shows an overvoltage protection circuit with a soft start function in accordance with a first exemplary embodiment. The overvoltage protection circuit 100 includes a PMOS transistor Q1 (first switch) to separate a system 22 from an input circuit 21, voltage-dividing resistors R1 and R2 to monitor an input voltage VIN, a comparator 110 to determine the overvoltage of the input voltage VIN, voltage-dividing resistors R3, R4 and R5 to generate a comparison reference voltage, an input resistor RIN, and a clamp circuit 12.

Further, in this first exemplary embodiment, the overvoltage protection circuit 100 also includes a rise delay circuit 120 that waits until the circuit is stabilized on startup, a soft switching control circuit 130 to implement a soft switching of the PMOS transistor Q1, a pull-up resistor RUP to turn off the PMOS transistor Q1, an NMOS transistor Q2 (second switch) that is turned on when an overvoltage does not occur and is turned off when an overvoltage occurs so that the soft switching control circuit 130 is protected from the application of the overvoltage, and a capacitive element CGS that is used to maintain the PMOS transistor Q1 in the Off-state even when an abrupt overvoltage occurs.

Note that the capacitive element CGS is disposed between the source and the gate of the PMOS transistor Q1. Further, the pull-up resistor RUP is disposed in parallel with the capacitive element CGS on the outer side of the capacitive element CGS between the source and the gate of the PMOS transistor Q1. The NMOS transistor Q2 is disposed between the gate of the PMOS transistor Q1 and the soft switching control circuit 130. Further, an output from the rise delay circuit 120 is applied to the gate VG2 of the NMOS transistor Q2. An output from the rise delay circuit is applied to the gate of the NMOS transistor Q2, and also supplied to the soft switching control circuit 130 as an Enable signal.

Figure 2:
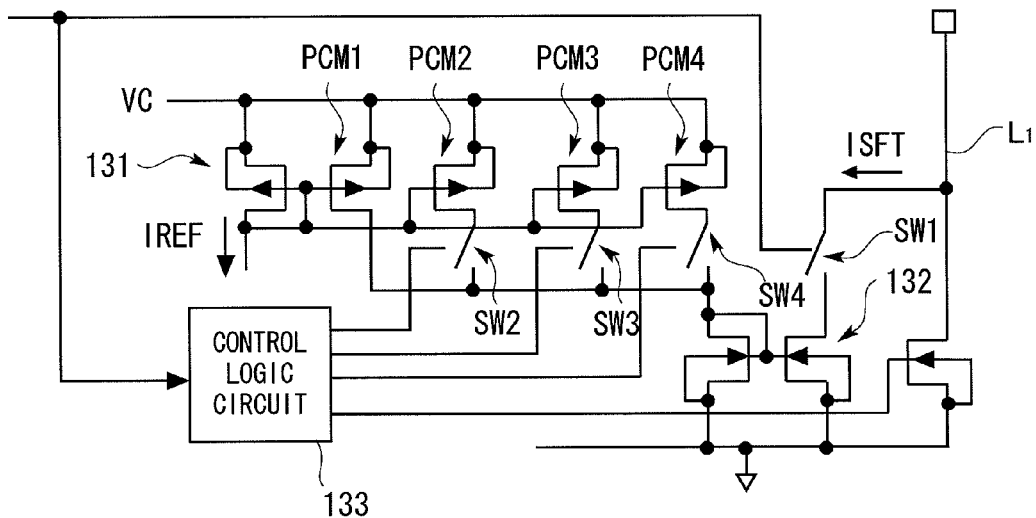
FIG. 2 shows a configuration of a soft switching control circuit.

The soft switching control circuit 130 is implemented by a circuit configuration shown in FIG. 2. A plurality of PMOS transistors PCM1 to PCM4, which are arranged in parallel, serve as a current mirror with respect to the current source IREF. This current mirror is referred to as "first current mirror 131". Switches SW2 to SW4 are provided at the drains of the respective PMOS transistors PCM2 to PCM4. Further, the output of the PMOS transistor PCM1 is directly connected to the input of a second current mirror 132, while the PMOS transistors PCM2 to PCM4 are connected to the second current mirror 132 through the switches SW2 to SW4 respectively. Furthermore, a current that flows to a line L1 connected to the gate VG1 of the PMOS transistor Q1 through the NMOS transistor Q2 is referred to as "current ISFT". This line L1 is connected to the output of the second current mirror 132 through a switch SW1, whose On/Off state is controlled by an Enable signal from the rise delay circuit 120. When a control logic circuit 133 receives an Enable signal having a High level, it turns on the switches SW2, SW3 and SW4 in succession with a time difference between one turning-on action to another.

Figure 3:
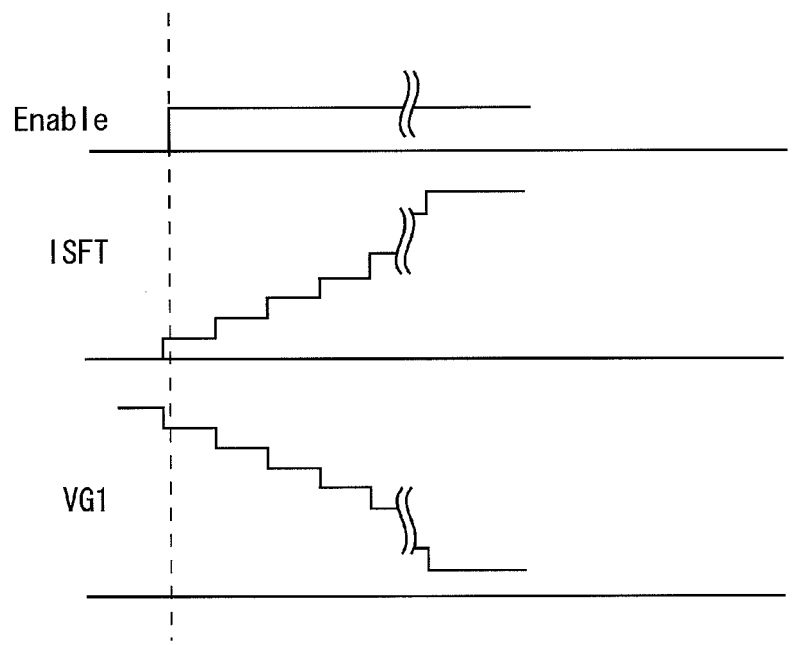
FIG. 3 shows waveforms of a current ISFT flowing through a line L1 and a voltage VG1 applied to the gate of a PMOS transistor Q1 by the operation of a soft switching control circuit.

FIG. 3 shows waveforms of a current ISFT flowing through the line L1 and a voltage VG1 applied to the gate of the PMOS transistor Q1 by the operation of a soft switching control circuit 130. Upon receiving an Enabling signal from the rise delay circuit 120, the control logic circuit 133 increases the output current ISFT gradually by turning on the switches SW1 and SW2 to SW4 one after another. Note that since the NMOS transistor Q2 shown in FIG. 1 has been already turned on at the same moment as the Enable signal becomes equal to a High level, the gate voltage VG1 of the PMOS transistor Q1 decreases gradually with a voltage drop rate that is determined based on the pull-up resistor RUP and the output current ISFT of the soft switching control circuit 130 shown in FIG. 1. In this way, a soft switching can be implemented.

Figure 4:
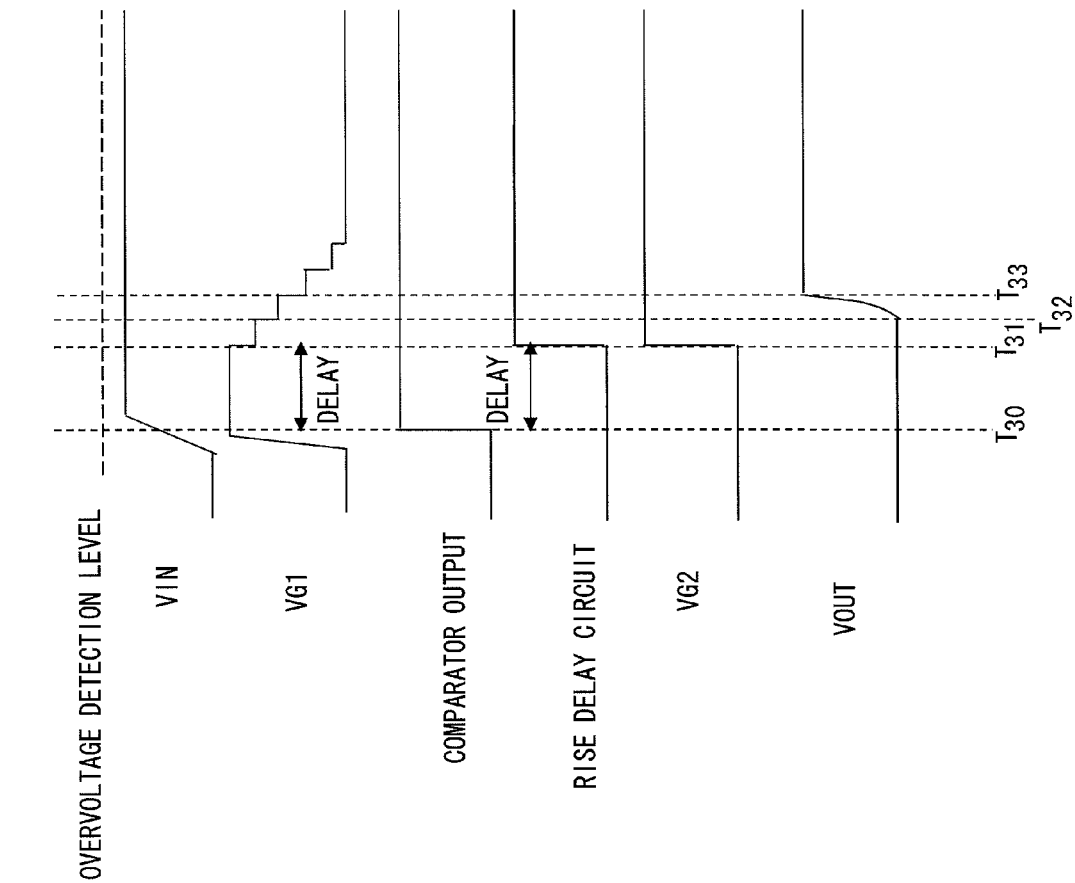
FIG. 4 shows an operation in accordance with a first exemplary embodiment of the present invention in a state where an input voltage VIN below an overvoltage detection level is supplied.

Operations of the overvoltage protection circuit 100 having the configuration like this in accordance with the first exemplary embodiment are explained hereinafter. FIG. 4 shows an operation in accordance with the first exemplary embodiment in a state where an input voltage VIN below an overvoltage detection level is supplied. The input voltage VIN rises and reaches the operation start voltage at a time T30. At this point, when the input voltage VIN starts to be supplied, a High level is applied to the gate of the PMOS transistor Q1 by the effect of the pull-up resistor RUP and the PMOS transistor Q1 is thereby maintained in the Off-state. Further, even in the case where the input voltage VIN rises sharply, when the input voltage VIN rises, an electrical charge is fed into the gate of the PMOS transistor Q1 from the capacitive element CGS and makes up for the response delay, which is caused by the pull-up resistor RUP and the gate capacitance of the PMOS transistor Q1. As a result, the PMOS transistor Q1 is maintained in the Off-state.

Further, when it is determined that the input voltage VIN is not an overvoltage in the comparator 110, the comparator 110 outputs a High level as an operation signal. The High level from the comparator 110 is input to the rise delay circuit 120, and after the rising delay, the rise delay circuit 120 outputs a High level to the gate VG2 of the NMOS transistor Q2 and the soft switching control circuit. The NMOS transistor Q2 is turned on by the application of the High level to its gate. Further, the gate voltage VG1 of the PMOS transistor Q1 falls gently by the soft switching control performed by the soft switching control circuit 130. Then, while the inrush current to the system 22 is suppressed, the PMOS transistor Q1 is turned on and the voltage supply to the system thereby starts.

Figure 5:
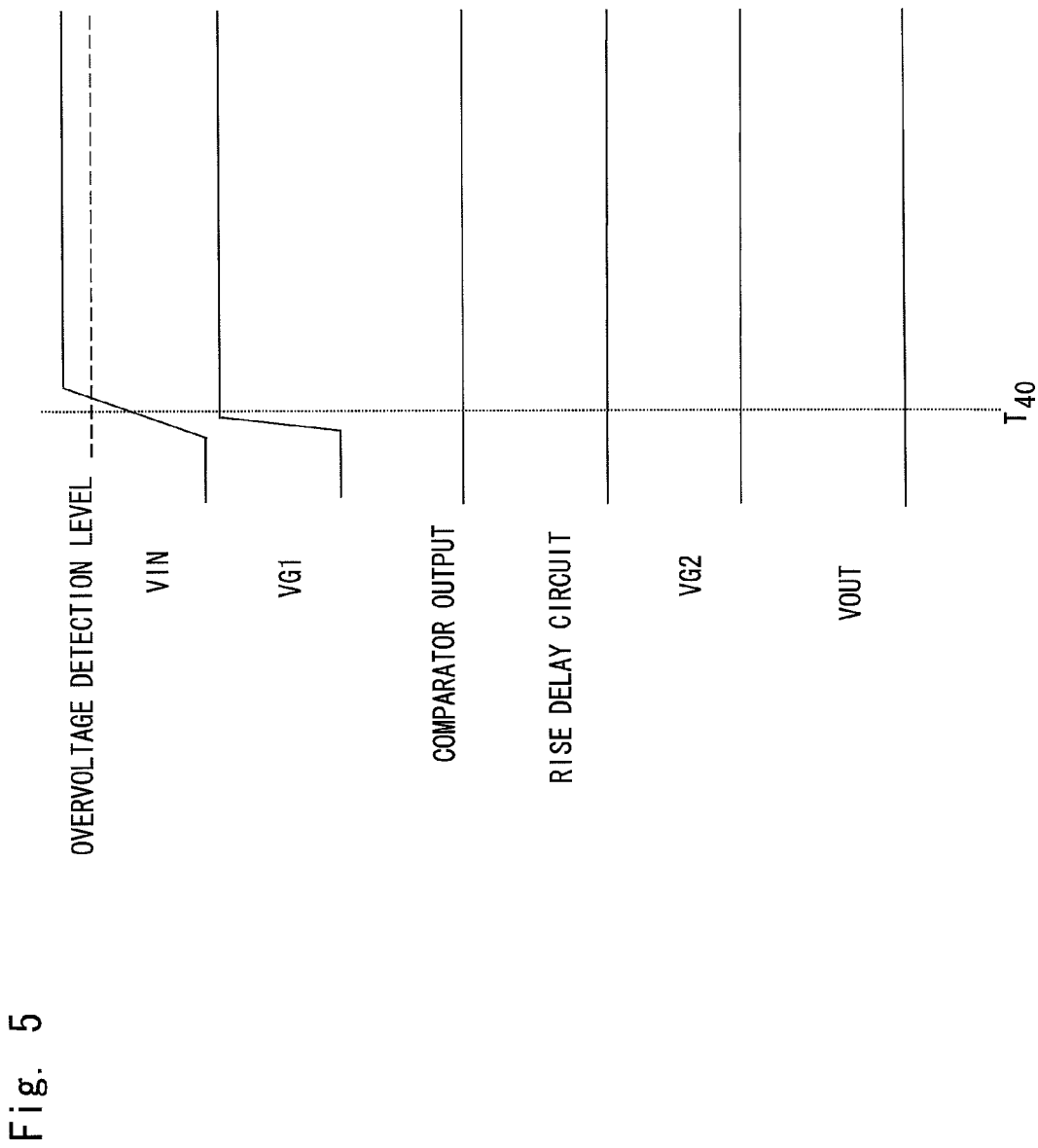
FIG. 5 shows a potential relation between the gate voltage VG1 of the PMOS transistor Q1 and the output voltage VOUT in a state where an input voltage VIN equal to or higher than an overvoltage detection level is supplied.
Figure 12:
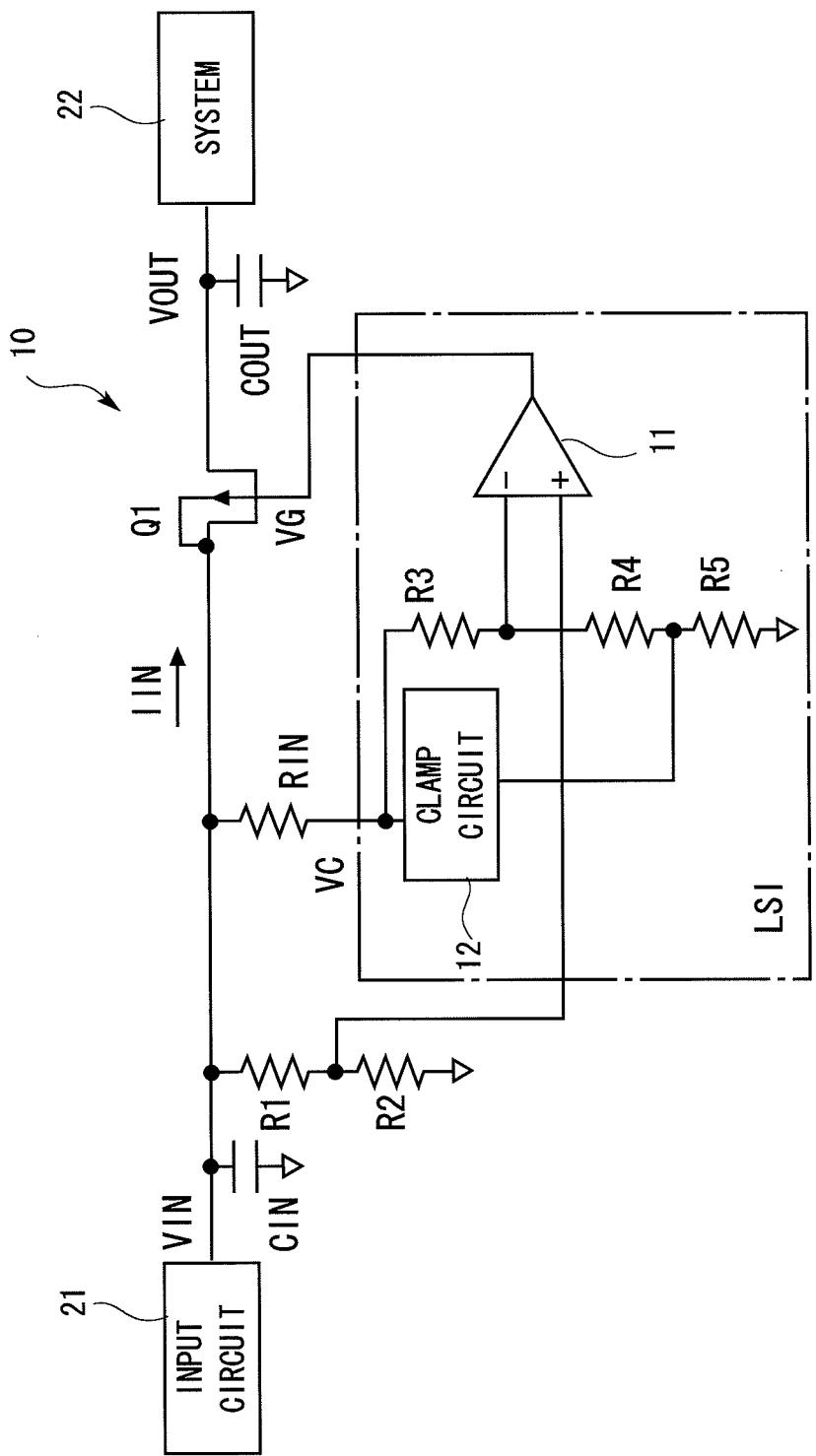
FIG. 12 shows an overvoltage protection circuit as related art.
Figure 13:
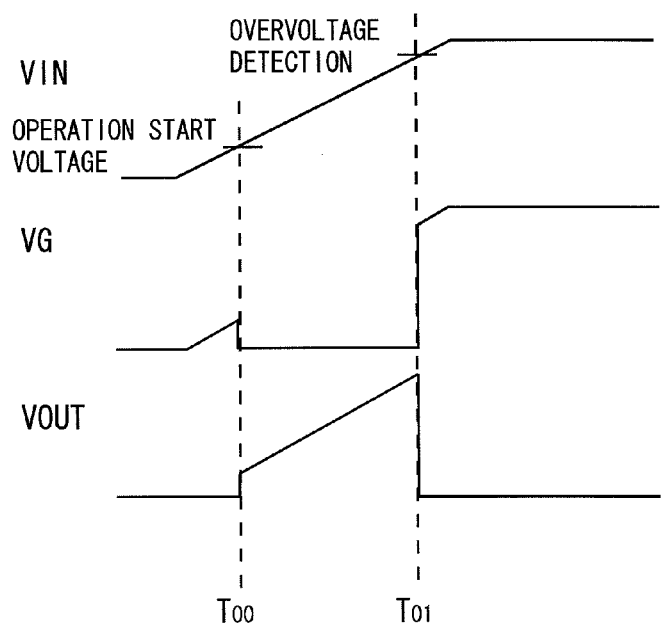
FIG. 13 shows a potential relation of a direct-current fashion among the potential of the input voltage VIN, the gate voltage VG of a PMOS transistor Q1, and the output voltage VOUT in an overvoltage protection circuit shown in FIG. 12.
Figure 14:
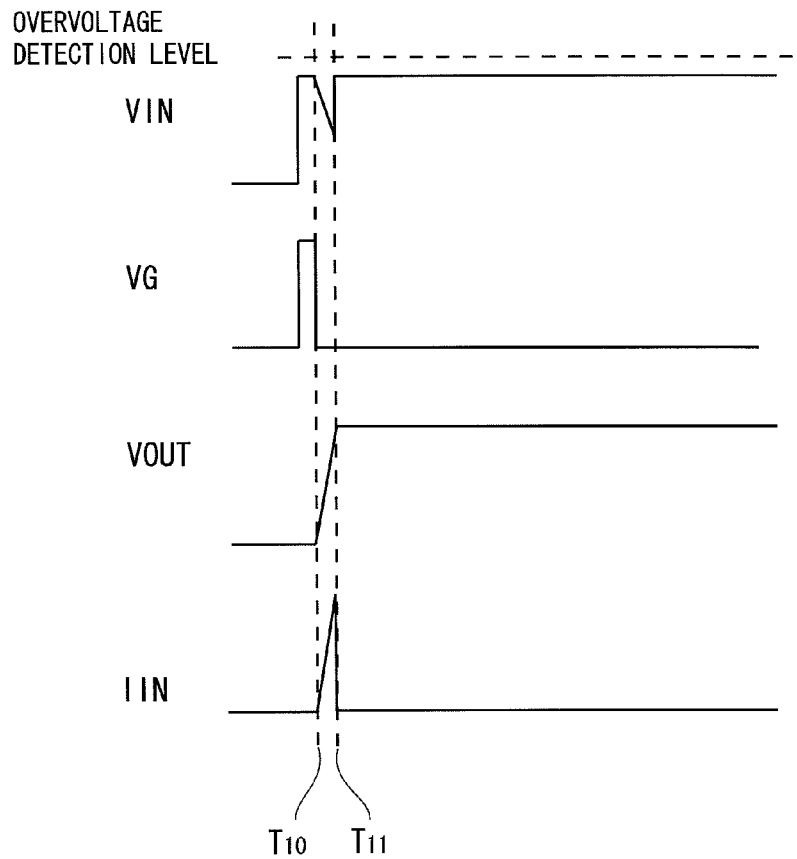
FIG. 14 shows a transient potential relation in an overvoltage protection circuit shown in FIG. 12 in detail.
Figure 15:
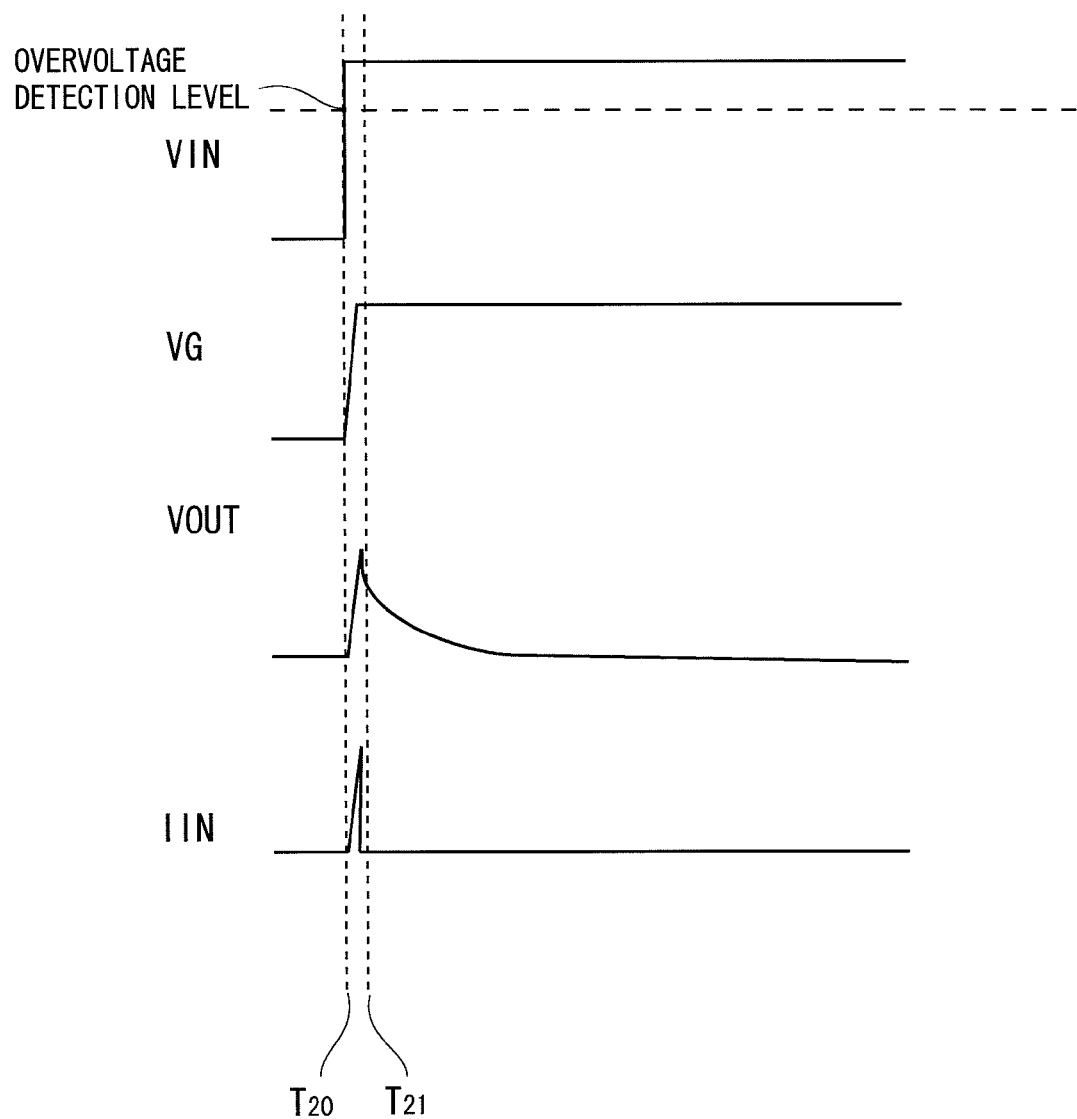
FIG. 15 shows a transient potential relation in an overvoltage protection circuit shown in FIG. 12 in detail.

Next, FIG. 5 shows a potential relation between the gate voltage VG1 of the PMOS transistor Q1 and the output voltage VOUT in a state where an input voltage VIN equal to or higher than an overvoltage detection level is supplied. As the input voltage VIN rises, the PMOS transistor Q1 is maintained in the Off-state by the effect of the pull-up resistor RUP. Further, even when the input voltage VIN rises sharply, an electrical charge is fed into the gate of the PMOS transistor Q1 from the capacitive element CGS side and makes up for the response delay, which is caused by the pull-up resistor RUP and the gate capacitance of the PMOS transistor Q1. As a result, the PMOS transistor Q1 remains in the Off-state. As described above, the PMOS transistor Q1 is maintained in the Off-state at the moment at which the input voltage VIN rises regardless of whether an overvoltage is detected or not in the comparator 110. Therefore, the voltage leak like the one shown in FIG. 12, which would be otherwise caused by the delay in the operation of the PMOS transistor Q1, can be prevented.

In accordance with the first exemplary embodiment of the present invention having the configuration like this, the following advantageous effects are obtained.

(1) Since the gate voltage VG1 of the PMOS transistor Q1 decreases gradually by the soft switching control circuit 130, the sudden inrush current can be prevented from occurring. In this way, the voltage drop by the inrush current is prevented in the input circuit 21, it contributes to the circuit protection and the stable operation.

(2) Since a pull-up resistor RUP is provided between the source and gate of the PMOS transistor Q1, the PMOS transistor Q1 can be maintained in the Off-state when the input voltage VIN rises. In this first exemplary embodiment, when the input voltage VIN rises, the PMOS transistor Q1 needs to be maintained in the Off-state so that the PMOS transistor Q1 can be soft-started. However, if the input voltage VIN is applied to the source side of the PMOS transistor Q1 and the voltage between the source and gate of the PMOS transistor Q1 thereby exceeds the threshold, the PMOS transistor Q1 could be turned on before it is soft-started. With regard to this, the gate voltage VG1 of the PMOS transistor Q1 is raised by the pull-up resistor RUP so that the PMOS transistor Q1 is maintained in the Off-state in this first exemplary embodiment. In this way, a soft start by the soft switching control circuit 130 becomes possible.

(3) Further, a capacitive element CGS is provided between the source and gate of the PMOS transistor Q1. Therefore, even if the input voltage VIN rises so abruptly that the voltage rise by the pull-up resistor RUP cannot keep up with the rise in the input voltage VIN, the gate voltage VG1 of the PMOS transistor Q1 is raised at once by an electrical charge discharged from the capacitive element CGS and the PMOS transistor Q1 can be thereby reliably maintained in the Off-state.

Figure 6:
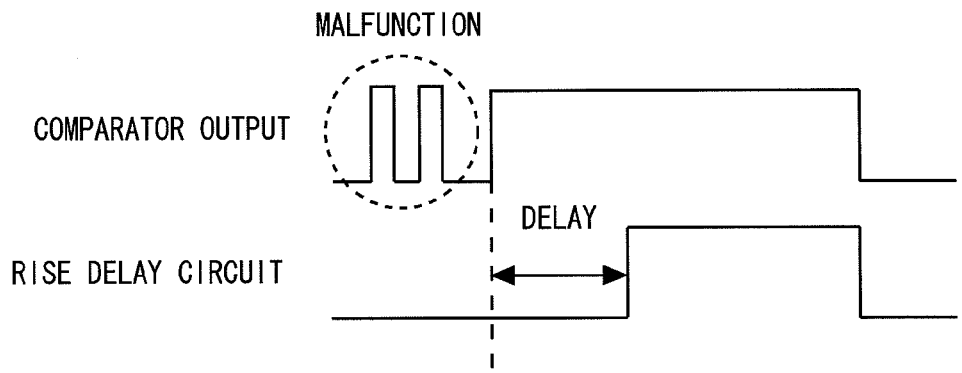
FIG. 6 shows a case where an unstable signal is output from the comparator in a low voltage region.

(4) Since a rise delay circuit 120 is provided between the comparator 110 and the soft switching control circuit 130, the overvoltage protection circuit can be configured so as not to be affected by a malfunction of the comparator 110 in a low voltage region. That is, even if a comparator with a hysteresis function that can stabilize its output is used as the comparator 110, there is a possibility that an unstable signal could be output from the comparator 110 in a low voltage region as shown in FIG. 6. Even in such a case, debounce processing is carried out by delaying the signal by the rise delay circuit 120, and therefore an unintended turning-on action of the PMOS transistor Q1 can be prevented.

(5) When an overvoltage occurs, the NMOS transistor Q2 is turned off so that the input voltage VIN in the overvoltage state can be prevented from flowing into the soft switching control circuit 130. In this way, the soft switching control circuit 130 can be protected from the overvoltage. Further, a region of the LSI including the soft switching control circuit 130 can be constructed by using components of a withstand voltage.

[First Modified Embodiment]

Figure 7:
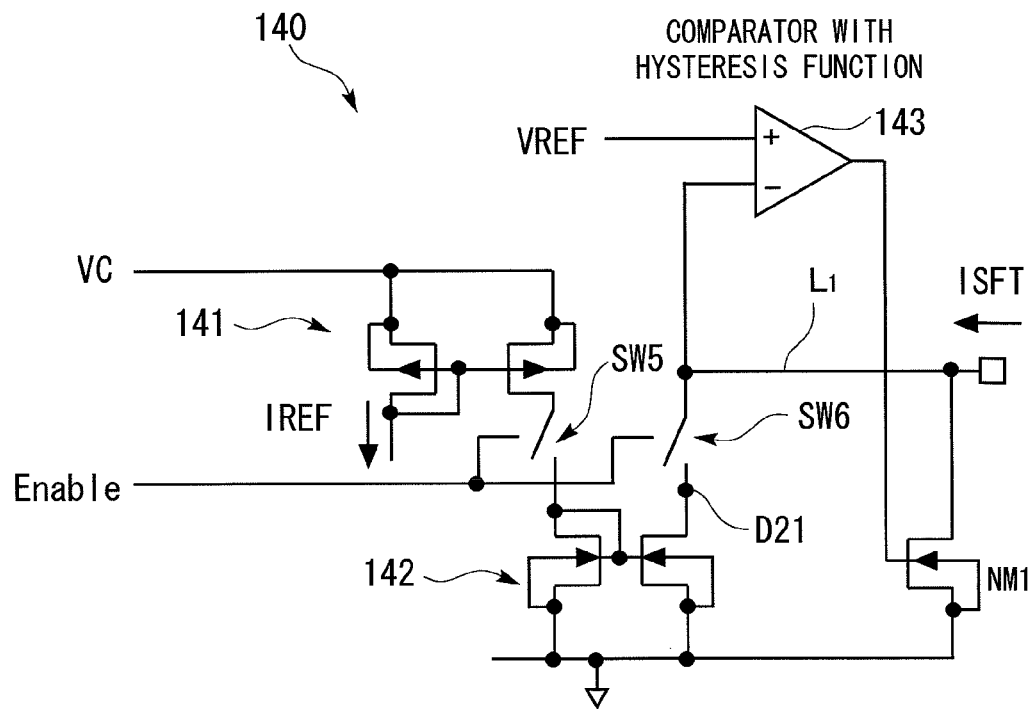
FIG. 7 shows a modified embodiment of a soft switching control circuit.

Note that although the configuration shown in FIG. 2 is shown as an example of the soft switching control circuit in the above-described exemplary embodiment, a soft switching control circuit 140 having a configuration shown in FIG. 7 can be also applied as a modified embodiment. Assume that the current source IREF has a fixed value in FIG. 7. That is, the current source IREF is supposed to appear at the output node D21 of a fourth current mirror 142 by a third current mirror 141 and the fourth current mirror 142. Further, the output of the third current mirror 141 is connected to the input of the fourth current mirror 142 through a switch SW5. Further, the output node D21 of the fourth current mirror 142 is connected to a line L1, which is connected to the gate of the PMOS transistor Q1, through a switch SW6. The On-Off states of the switches SW5 and SW6 are controlled by an Enable signal.

Further, a comparator 143, whose negative and positive terminals are connected to the line L1 and a reference voltage VREF respectively, is also provided. The output of the comparator 143 is applied to the gate of an NMOS transistor NM1 disposed between the line L1 and a ground GND.

Figure 8:
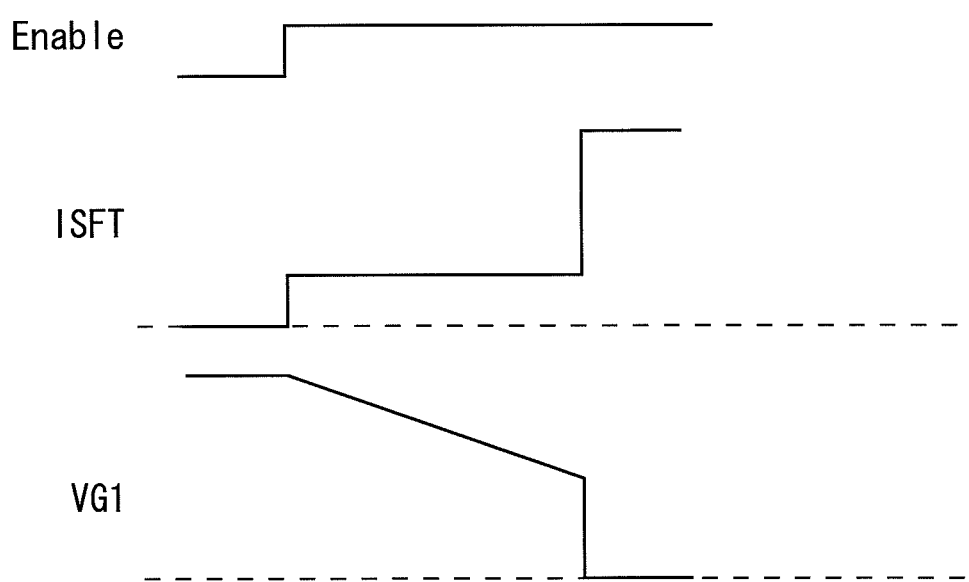
FIG. 8 shows waveforms of a current ISFT and the gate voltage VG1 of a PMOS transistor Q1 by the operation of a soft switching control circuit 140 in accordance with a first modified embodiment.

FIG. 8 shows waveforms of a current ISFT and the gate voltage VG1 of the PMOS transistor Q1 exhibited by the operation of the soft switching control circuit 140 in accordance with the first modified embodiment. When the Enable signal is input from the rise delay circuit 120 to the soft switching control circuit 140, the switches SW5 and SW6 are turned on. As a result, a fixed current value ISFT flows through the line L1. When the current ISFT having a fixed value flows, the electrical charge accumulated in the gate capacitance of the PMOS transistor Q1 and the capacitive element CGS is gradually discharged. In this process, the gate voltage VG1 of the PMOS transistor Q1 gradually falls with a slop determined by a formula V=IREF×t/C.

The comparator 143 determines whether or not the voltage of the line L1, which is the output voltage of the soft switching control, falls to a given potential (reference potential VREF). In response to this determination, the comparator 143 turns on the NMOS transistor NM1 and thereby brings down the output voltage of the switching control to 0 V. As a result, the PMOS transistor Q1 is completely turned on. Therefore, the supply of electrical power to the system 22 starts with a soft start.

[Second Exemplary Embodiment]

Next, a second exemplary embodiment is explained. It has been explained that with a configuration in accordance with the first exemplary embodiment, the voltage drop is prevented by a soft start and that the leakage of the overvoltage can be prevented even when the voltage rises sharply to the overvoltage state. However, since the pull-up resistor RUP and the capacitance CGS are provided to maintain the PMOS transistor Q1 in the Off-state in the first exemplary embodiment, there is a possibility that the PMOS transistor Q1 could takes a relatively long time to change from an On-state to an Off-state. For example, if the input voltage VIN reaches an overvoltage after the PMOS transistor Q1 is once completely turned on, there is a possibility that the overvoltage could leak to the system 22. To begin with, this problem is explained with reference to a timing chart shown in FIG. 9.

Figure 9:
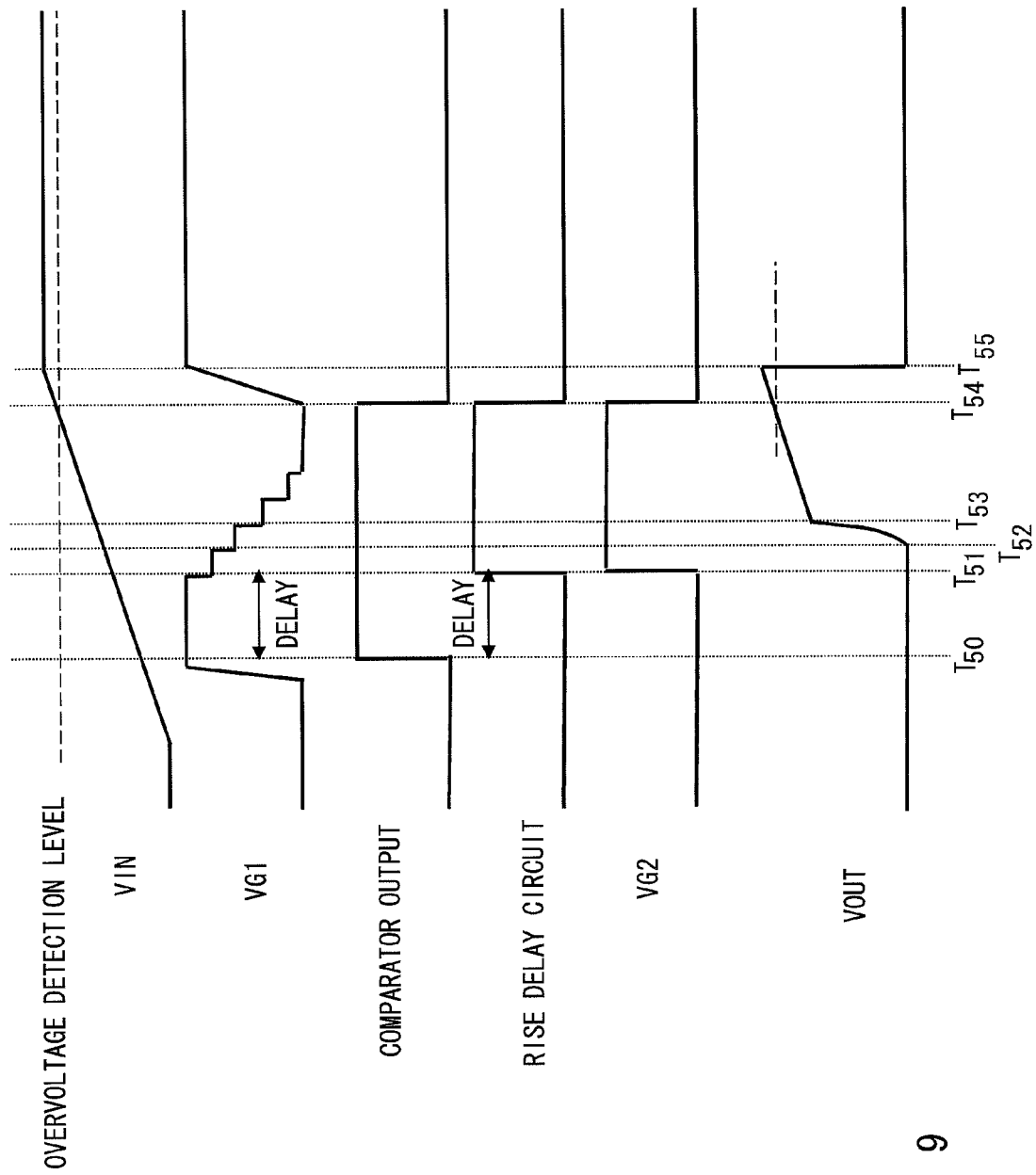
FIG. 9 is a graph for explaining an operation in a case where an overvoltage occurs after the PMOS transistor Q1 is turned completely on in a first exemplary embodiment of the present invention.

FIG. 9 is a graph for explaining an operation of the first exemplary embodiment in a case where the input voltage VIN gradually reaches an overvoltage over a long starting time. The operations carried out when the input voltage VIN is input, in which the PMOS transistor Q1 is turned on and electrical power is thereby supplied to the system, are the same as those explained above with reference to FIG. 2. That is, at the beginning, the PMOS transistor Q1 is maintained in the Off-state by the pull-up resistor RUP and the capacitance CGS.

Then, the input voltage VIN is determined to be equal to or higher than the overvoltage detection level at the comparator output, and a High level is thereby output from the comparator 110. The comparator output is delayed by the rise delay circuit 120, and then turns on the NMOS transistor Q2 and starts up the soft switching control circuit 130. As a result, the gate voltage VG1 of the PMOS transistor Q1 gradually falls, and the PMOS transistor Q1 is eventually turned on completely. Therefore, the voltage is supplied to the system 22.

An operation in a case where after the PMOS transistor Q1 is once completely turned on, the input voltage VIN further rises and eventually exceeds the overvoltage detection level is explained hereinafter. When the input voltage VIN exceeds the overvoltage detection level at a time T54, this overvoltage is detected by the comparator 110. Therefore, the comparator 110 outputs a Low level as an overvoltage detection signal. As a result, the NMOS transistor Q2 is turned off and the soft switching control circuit 130 is stopped. In this way, the soft switching control circuit 130 is protected from the overvoltage.

At this point, although the pull-up resistor RUP acts to turn off the PMOS transistor Q1, the actual turning-off of the PMOS transistor Q1 is delayed by a time determined by the time constant of the gate capacitance of the PMOS transistor Q1, the capacitive element CGS, and the pull-up resistor RUP (time $T_{55}$). As a result, during the time from the detection of the overvoltage to the actual turning-off of the PMOS transistor Q1 (time $T_{54}$ to $T_{55}$), there is a possibility that the overvoltage could be applied to the system 22 to the extent corresponding to the delay of the turning-off of the PMOS transistor Q1.

Figure 10:
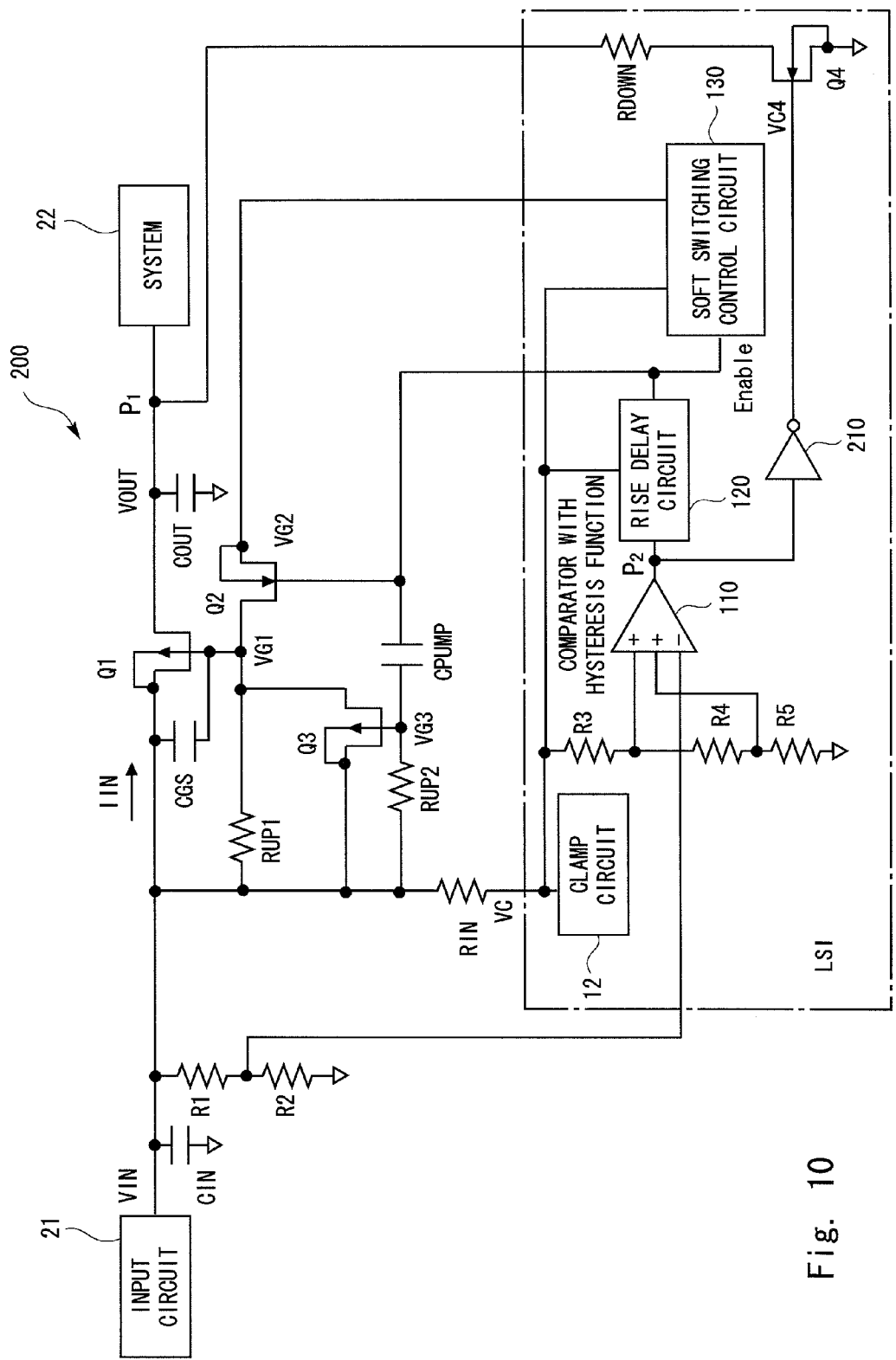
FIG. 10 shows an overvoltage protection circuit in accordance with a second exemplary embodiment of the present invention.

Therefore, as a configuration to solve the above-described problem, FIG. 10 shows an overvoltage protection circuit 200 in accordance with a second exemplary embodiment of the present invention. The fundamental configuration of the second exemplary embodiment is similar to that of the first exemplary embodiment. However, one of the features of the second exemplary embodiment lies in that even when the input voltage VIN reaches to an overvoltage after the PMOS transistor Q1 is completely turned on, the PMOS transistor Q1 can be swiftly turned off and the overvoltage can be discharged. By doing so, the system 22 can be reliably protected from the overvoltage.

In FIG. 10, a PMOS transistor Q3 (third switch) is connected across the pull-up resistor RUP1 such that the PMOS transistor Q3 is connected in parallel with the pull-up resistor RUP1 in the second exemplary embodiment. A pull-up resistor RUP2 is provided between the gate of the PMOS transistor Q3 and the input, and a capacitive element CPUMP is provided between the gate of the PMOS transistor Q3 and the gate of the NMOS transistor Q2.

A branch point $P_1$ is provided between the power supply VOUT and the system input, and an NMOS transistor Q4 (fourth switch) is provided between this branch point $P_1$ and the ground GND with a resistor RDOWN interposed between the branch pint $P_1$ and the NMOS transistor Q4. Further, an inverter 210 is disposed between the branch point $P_2$ between the output of the comparator 110 and the rise delay circuit 120 and the gate of the NMOS transistor Q4. Therefore, the inverter output is applied to the gate of the NMOS transistor Q4.

Figure 11:
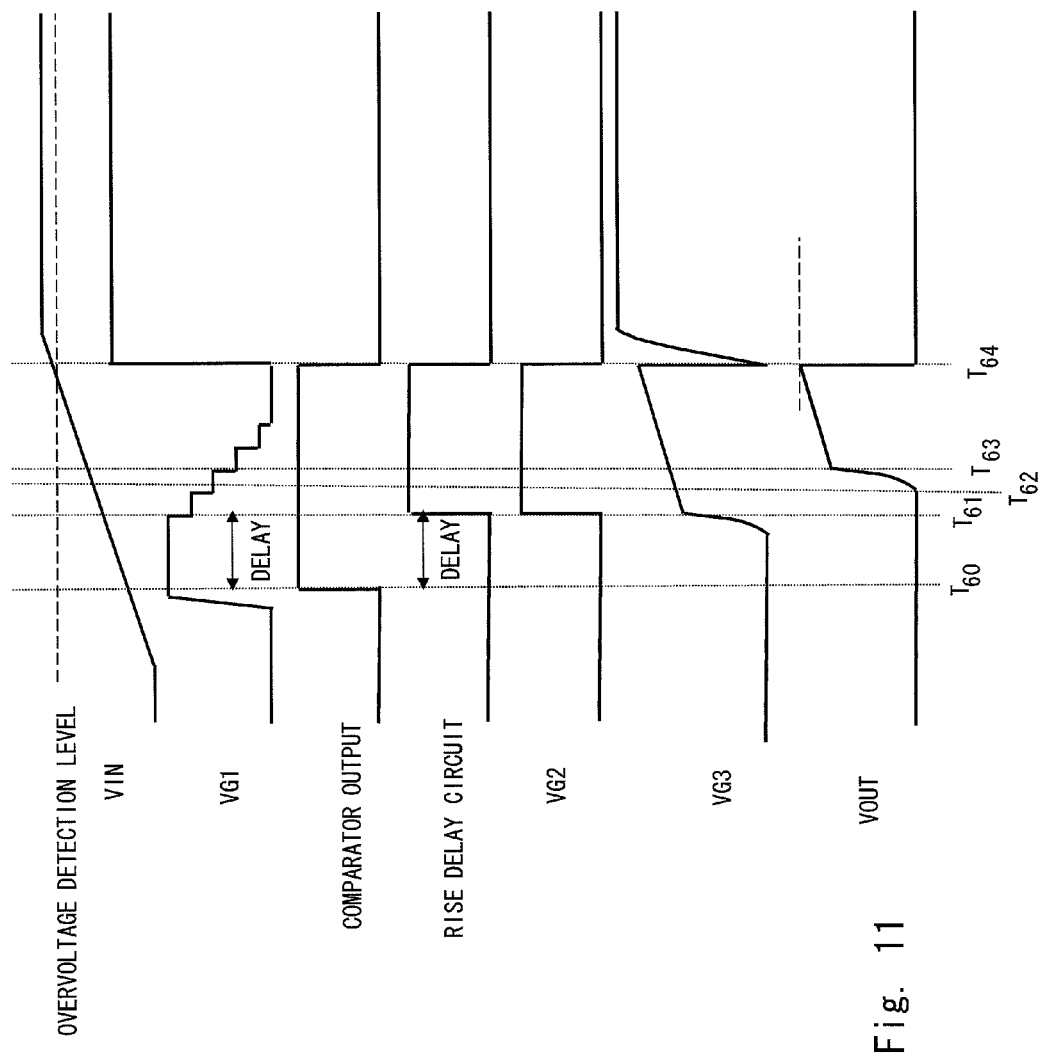
FIG. 11 is a graph for explaining an operation in accordance with a second exemplary embodiment of the present invention.

The operation of the second exemplary embodiment having the configuration like this is explained with reference to FIG. 11. Assume that after the input voltage VIN rises and the PMOS transistor Q1 is once completely turned on, the input voltage VIN rises further and eventually exceeds the overvoltage detection level at a time $T_{64}$. At this point, the overvoltage is detected by the comparator 110 and the comparator 110 thereby outputs a Low level. As a result, the Low level is applied to the gate of the NMOS transistor Q2 and the NMOS transistor Q2 is thereby turned off. Further, the soft switching control circuit 140 is stopped by the Low level from the comparator 110.

At the same time, the Low level output from the comparator 110 is also propagated to the gate of the NMOS transistor Q4 through the inverter 210. That is, the High level from the inverter 210 is applied to the gate of the NMOS transistor Q4. In this way, when an overvoltage is detected, the overvoltage is not applied to the system.

Further, when the gate voltage of the NMOS transistor Q2 changes from a High level to a Low level, the gate voltage of the PMOS transistor Q3 is temporarily drawn to a Low-level side by the capacitance CPUMP. As a result, the PMOS transistor Q3 is turned on. Since the PMOS transistor Q3 is turned on, the gate voltage VG of the PMOS transistor Q1 rises to the input voltage VIN at once. As a result, the PMOS transistor Q1 is turned off. In this way, the input voltage VIN in the overvoltage state is cut off from the system 22, and therefore the system 22 is protected.

As described above, in accordance with the second exemplary embodiment, by increasing the response speed at which the PMOS transistor Q1 is turned off, the overvoltage is prevented from leaking into the system. Further, the NMOS transistor Q4 is provided to discharge the output VOUT to the ground GND when an overvoltage is detected, and therefore the system 22 can be protected more reliably.

Further, the present invention is not limited to above-described exemplary embodiments, and various modifications can be made without departing from the spirit of the present invention.

While the invention has been described in terms of several exemplary embodiments, those skilled in the art will recognize that the invention can be practiced with various modifications within the spirit and scope of the appended claims and the invention is not limited to the examples described above.

The exemplary embodiments described above can be combined as desirable by one of ordinary skill in the art.

Further, the scope of the claims is not limited by the exemplary embodiments described above.

Furthermore, it is noted that, Applicant's intent is to encompass equivalents of all claim elements, even if amended later during prosecution.

What is claimed is:

1. An overvoltage protection circuit that prevents an overvoltage from flowing into a system and thereby protects the system, comprising:
   a first switch to function as a switch disposed between an input circuit and the system, the input circuit being configured to supply an input voltage, and the first switch being constructed of a semiconductor transistor;
   a comparator that determines an occurrence of an overvoltage by comparing the input voltage with a predetermined reference voltage, and when no overvoltage is detected, outputs an operation signal;
   a soft switching control circuit that starts up by using the operation signal from the comparator as an enable signal, and turns on the first switch gradually by gradually increasing a voltage between a source and a gate of the first switch; and
   a second switch provided between the soft switching control circuit and the input circuit, the second switch being configured to cutoff a current path between the input circuit and the soft switching control circuit in response to an overvoltage detection signal output from the comparator.

2. The overvoltage protection circuit according to claim 1, wherein a delay circuit is provided between the comparator and the soft switching control circuit, the delay circuit being configured to delay the operation signal from the comparator.

3. The overvoltage protection circuit according to claim 2, wherein the second switch is an NMOS transistor that is coupled between an output node of the soft switching control circuit and a node between a gate of the first switch and the input circuit, a gate of the NMOS transistor is coupled with an output node of the delay circuit.

4. The overvoltage protection circuit according to claim 1, wherein
   the first switch is a first PMOS transistor, and
   a pull-up resistor is provided between a source and a gate of the first PMOS transistor.

5. The overvoltage protection circuit according to claim 1, wherein
   the first switch is a first PMOS transistor, and
   a first capacitive element is provided between a source and a gate of the first PMOS transistor.

6. The overvoltage protection circuit according to claim 4, wherein
   the comparator outputs the overvoltage detection signal when an overvoltage is detected,
   a third switch is provided in parallel with the pull-up resistor, and
   the third switch is turned on in response to the overvoltage detection signal from the comparator.

7. The overvoltage protection circuit according to claim 5, wherein
   the comparator outputs the overvoltage detection signal when an overvoltage is detected,
   a third switch is provided in parallel with the first capacitive element, and
   the third switch is turned on in response to the overvoltage detection signal from the comparator.

8. The overvoltage protection circuit according to claim 1, wherein
   the comparator outputs the overvoltage detection signal when an overvoltage is detected,
   a fourth switch is provided in a branch line, the branch line being branched from a node between the first switch and the system and connected to a ground potential, and
   the fourth switch is turned on in response to the overvoltage detection signal from the comparator.

9. The overvoltage protection circuit according to claim 1, wherein the soft switching control circuit comprises:
   a plurality of transistors arranged in parallel to serve as a current mirror with respect to a current source.

10. The overvoltage protection circuit according to claim 1, wherein the soft switching control circuit further comprises:
    a first enabling switch connected to a first one of the plurality of transistors; and
    a second enabling switch connected a second one of the plurality of transistors, wherein the first and the second enabling switches are controlled to turn on with a time interval between each other.

11. The overvoltage protection circuit according to claim 1, further comprising:
    an input resistor, one end of the input resistor being coupled with the input voltage;
    a clamp circuit coupling with another end of the input resistor and generating a constant voltage at a node between the input resistor and the clamp circuit,
    wherein the clamp circuit, the comparator circuit, the soft switching control circuit and the delay circuit are formed in a LSI (large-Scale Integrated) circuit device, the constant voltage is applied to both the comparator circuit, the soft switching control circuit.

12. The overvoltage protection circuit according to claim 11, further comprising:
    a delay circuit provided between the comparator and the soft switching control circuit, the delay circuit being configured to delay the operation signal from the comparator,
    wherein the constant voltage is further applied to the delay circuit.

13. The overvoltage protection circuit according to claim 11, further comprises first to third resistors coupled in series in this order,
    wherein the constant voltage is applied to one end of the first resistor, a first reference voltage generated at a node between the first and second resistors is applied to a first non-inverted input node of the comparator circuit, a second reference voltage generated at a node between the second and third resistors is applied to a second non-inverted input node of the comparator circuit, a monitoring voltage based on the input voltage is applied to an inverted input node of the comparator circuit.

* * * * *